(12) United States Patent
Watson et al.

(10) Patent No.: US 7,213,143 B1
(45) Date of Patent: May 1, 2007

(54) SECURITY OVER A NETWORK

(75) Inventors: Mark Watson, London (GB); Iain Sharp, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 669 days.

(21) Appl. No.: 10/351,935

(22) Filed: Jan. 27, 2003

(51) Int. Cl.
G06F 1/24 (2006.01)

(52) U.S. Cl. .................... 713/151; 713/152; 713/164; 713/166

(58) Field of Classification Search ............. 713/151, 713/152, 164, 166
See application file for complete search history.

(56) References Cited

U.S. PATENT DOCUMENTS

| 5,495,580 | A | * | 2/1996 | Osman ..................... 726/13 |
| 5,623,601 | A | * | 4/1997 | Vu .......................... 726/12 |
| 5,774,695 | A | * | 6/1998 | Autrey et al. ............. 703/26 |
| 5,778,189 | A | * | 7/1998 | Kimura et al. ........... 709/236 |
| 2002/0129236 | A1 | | 9/2002 | Nuutinen |

FOREIGN PATENT DOCUMENTS

EP  1107504 A2  6/2001

OTHER PUBLICATIONS

Blom R et al: "Conversational IP Multimedia Security" Ericsson Research, Sep. 9, 2002, pp. 147-151.

* cited by examiner

Primary Examiner—Thomas R. Peeso
(74) Attorney, Agent, or Firm—Barnes & Thornburg LLP

(57) ABSTRACT

According to one aspect of the present invention there is provided a method of preparing second protocol data for transmitting over a first protocol network comprising the steps of compressing the data to be transmitted in accordance with the first protocol, to produced first protocol compressed data and encrypting the first protocol compressed data in accordance with the first protocol to produce first protocol compressed and encrypted data. The invention consists of a means for the client to indicate to the first hop proxy that it wishes S/MIME encryption to be applied to part of an outgoing message. The first hop proxy then applies this encryption on behalf of the client. The encryption is therefore applied after the message has traversed the end terminal link. On the first proxy link, the message is sent without S/MIME encryption and can therefore benefit from compression (before the first hop IPSEC encryption is applied). A second aspect of the invention allows the support of end-to-end compression to be negotiated between end devices so that SIP compression can be applied to data before it is encrypted using S/MIME by the end system.

26 Claims, 4 Drawing Sheets

SECURITY OVER A NETWORK

FIELD OF THE INVENTION

This invention relates to security of a network and is particularly, but not exclusively, relevant to low-bandwidth networks.

BACKGROUND OF THE INVENTION

There is currently a trend of migrating packet data communication onto low bandwidth networks such as cellular wireless networks, for example those specified by 3GPP. These networks can be used for multimedia sessions which are typically controlled by a protocol known as SIP (Session Initiation Protocol). SIP is an IETF standard which dictates the nature of messages which are transferred between multimedia devices in the network.

Multimedia devices may exchange SIP messages directly, or more often via network intermediates known as proxies. SIP proxies assist by routing SIP messages to the correct end point. End multimedia devices (which can send or receive) usually have a Default Proxy through which all outgoing and incoming SIP messages are routed. This default proxy can handle incoming messages when the device itself is not available (eg. route to voicemail server etc).

The SIP protocol includes end-to-end security capabilities (S/MIME) (Secure Multipurpose Interent Mail Extentions) which allow part of a message to be encrypted using a Public Key of the intended recipient. Other parts of the message remain unencrypted in order that they can be processed by intermediate entities (proxies) which assist in routing the message to the intended recipient.

In order to understand this more fully, it is useful to understand the SIP message format. FIG. 1 shows a schematic view of a SIP message format. The SIP message 10 includes message headers 12 and a message body 14,14' etc.

The SIP message follows common internet application layer message format and is similar to Internet Mail and HTTP. Message headers carry routing information and protocol machinery and are used by the proxies. Message bodies carry information end-to-end between multimedia devices, e.g. session parameters. The message is text encoded and the message bodies are formatted using MIME and security protected using S/MIME.

The S/MIME standard has predominantly been developed for securing Internet Mail. It allows the message body to be signed and therefore integrity protected and/or encrypted and therefore confidentiality protected. The proxies do not look at the message bodies, so the content and any associated encryption is transparent to proxies. Three common types of S/MIME protected message body are the Session Description Protocol (application/SDP) and SIP messages themselves (message/sip) or fragments of SIP messages (message/sipfrag).

The Session Description Protocol contains session parameters (media type, format, addresses etc.), possibly including encryption keys for the media.

Message bodies may also contain a copy of (parts of) the SIP Message Headers which can be compared with the received message headers to see if anything has been modified by the proxies or indeed if there have been any attacks on the SIP message.

Integrity protection is one of the most important applications. In addition, Encryption is needed for SDP to protect encryption keys and may be needed for SIPFRAGS's which contain additional headers for end-to-end use.

Key exchange protocols, e.g. MIKEY, can be embedded in SDP. MIKEY does not require secure transport, but does support an 'unprotected mode' for operation over secure transport such as S/MIME protected SDP The effect of S/MIME on a SIP message can be seen schematically in FIG. 2. The protected SIP message 20 includes message headers 22 and at least one message body wrapper 24. The message body wrapper includes an encrypted body 26 and a digital signature 28. The encryption and integrity protection afforded by this S/MIME is base on Public Key Technology. This requires that a certificate of the sender in included in the integrity protected message along with the signature and the certificate of the recipient is needed before the encrypted message can be sent.

3GPP have adopted SIP for their IP Multimedia Subsystem and it is likely that S/MIME will soon be adopted although there are some problems associated with this which will be addressed in greater detail below.

Another vital part of the SIP protocol which is relevant to this invention is SIP compression.

SIP messages use a highly inefficient text encoding method and as such are very verbose. SIGCOMP is a standardised compression mechanism for SIP messages, including their SDP bodies. This standardised compression mechanism has been found to be especially useful for low-bandwidth links as such as cellular wireless as used in the 3GPP IMS standard. SIGCOMP is used link-by-link i.e. between an end device (UA) and first proxy or between pairs of proxies. In order for SIGCOMP top be used for the first message sent, the sender must know, a priori, that the receiver or proxy supports SIGCOMP.

The SIGCOMP Messages have a number of features that are of relevance to this invention.

The first SIGCOMP message contains instructions for the recipient to decompress the message. These are in the form of a special bytecode to be run on a 'Universal Decompressor Virtual Machine' (UDVM). Typically the instructions are between 30 and 300 bytes, depending on the compression scheme chosen by the sender. Subsequent messages rely on the state at the receiver created by previous messages, including the decompression code uploaded with the first message. The compression efficiency increases greatly as more messages are sent and more state is built up. Some 'initial state', in the form of a static dictionary of common SIP/SDP phrases, can also be assumed.

At present, SIP messages between a 3GPP client and the first proxy benefit from encryption over the wireless link according to the 3GPP wireless packet data standards. Standard techniques defined by the IETF such as IPSEC or TLS can also be used to confidentiality protect the message between client and first proxy. 3GPP has adopted a compression scheme for SIP messages to reduce the bandwidth used by SIP signalling on the radio link between client and first proxy. This compression would be applied after any partial end-to-end encryption (S/MIME) but before the first-hop encryption (3GPP radio encryption and IPSEC or TLS).

In the drive for 3GPP to adopt SIP encryption and compression as currently defined in the SIP protocol a number of problems have been identified.

Use of end-to-end S/MIME encryption within the 3GPP IMS effectively negates the effectiveness of SIP compression on the radio link. The gains from SIP compression are expected to be very significant (SIP is very compressible), and so compression is expected to be essential in delivering reasonable message transmission times and hence reasonable call setup times.

In addition, compression relies on patterns and repeated text in the message to be compressed and encryption removes any such patterns/repetition. Thus, encrypted parts of the message will not compress. This is a major barrier to the introduction of S/MIME encryption into 3GPP IMS or other low-bandwidth applications.

OBJECT OF THE INVENTION

One of the objects of the present invention is to provide a scheme which operates in the 3GPP arena and for other low bandwidth applications which benefits from both the encryption (S/MIME) and compression (SIP comp) of the SIP protocol.

SUMMARY OF THE INVENTION

According to one aspect of the present invention there is provided a method of preparing second protocol data for transmitting over a first protocol network comprising the steps of compressing the data to be transmitted in accordance with the first protocol, to produced first protocol compressed data and encrypting the first protocol compressed data in accordance with the first protocol to produce first protocol compressed and encrypted data.

The invention consists of a means for the client to indicate to the first hop proxy that it wishes S/MIME encryption to be applied to part of an outgoing message. The first hop proxy then applies this encryption on behalf of the client. The encryption is therefore applied after the message has traversed the end terminal link. On the first proxy link, the message is sent without S/MIME encryption and can therefore benefit from compression (before the first hop encryption is applied).

For incoming messages, the first hop proxy can similarly apply S/MIME decryption before sending the message over the radio link. This requires that the Public Encryption Key provided to the peer client is a key owned by the proxy, and not the client.

The method may further comprise transmitting the second protocol data from a first end terminal supporting a second protocol to a second end terminal supporting a second protocol via the network which supports the first protocol.

The method may further comprise transmitting the second protocol data from the first end terminal to a first proxy and then onto the network and from the network to a second proxy and then onto the second end terminal. [MW: Not sure about the motivation for this paragraph, but if you are trying to capture the case where the first proxy encrypts on behalf of the client, then we probably shouldn't mention the second proxy, since it is only the first proxy which intervenes at the S/MIME layer (presumably S/MIME is the 'second protocol'). There may also be more than two proxies, but again only the first one actually intervenes at the S/MIME layer (well, and the last one if the receiver is also using the invention).

The method may further comprise compressing the data at a first end terminal and encrypting the data comprises encrypting the data at the first end terminal. [MW: not sure this sentence makes sense—perhaps there is a 'virtual comma' I am missing??!]

The method may further comprise compressing the data at a first end terminal and encrypting the data comprises encrypting the data at the first proxy. [MW: ditto ?]

According to a second aspect of the present invention there is provided a method of transmitting second protocol data over a first protocolnetwork comprising the steps of compressing the data to be transmitted in accordance with the first protocol, to produced first protocol compressed data; encrypting the first protocol compressed data in accordance with the first protocol to produce first protocol compressed and encrypted data; and transmitting the second protocol data over the first protocol network.

The method may further comprise transmitting the second protocol data from a first end terminal supporting a second protocol to a second end terminal supporting a second protocol via the network which supports the first protocol.

The method may further comprise transmitting the second protocol data from the first end terminal to a first proxy and then onto the network and from the network to a second proxy and then onto the second end terminal.

The method may further comprise compressing the data at a first end terminal and encrypting the data comprises encrypting the data at the first end terminal.

The method may further comprise compressing the data at a first end terminal and encrypting the data comprises encrypting the data at the first proxy.

According to a third aspect of the present invention there is provided a method of receiving second protocol data which has been compressed and encrypted in accordance with a first protocol and which has been transmitted over a first protocol network comprising the steps of decrypting the first protocol compressed data in accordance with the first protocol and decompressing the data to be transmitted in accordance with the first protocol.

In one embodiment, the data has been transmitted from a first end terminal supporting a second protocol to a second end terminal supporting a second protocol via the network supporting the first protocol.

In one embodiment, the data has been transmitted from the first end terminal to a first proxy and then onto the network and from the network to a second proxy and then onto the second end terminal.

In one embodiment, decompressing the data comprises decompressing the data at a second end terminal and decrypting the data comprises decrypting the data at the second end terminal.

In one embodiment, decompressing the data comprises decompressing the data at a second end terminal and decrypting the data comprises decrypting the data at the second proxy.

The invention is also directed to apparatus having components arranged to performs each of the method steps whereby to put the method into effect.

In particular, according to a fourth aspect of the invention there is provided apparatus for preparing second protocol data for transmission over a first protocol network comprising a compressor for compressing the data to be transmitted in accordance with the first protocol, to produced first protocol compressed data and an encryptor for encrypting the first protocol compressed data in accordance with the first protocol to produce first protocol compressed and encrypted data.

In one embodiment, the second protocol data is transmitted from a first end terminal supporting a second protocol to a second end terminal supporting a second protocol via the network supporting the first protocol.

In one embodiment, the second protocol data is transmitted from the first end terminal to a first proxy and then onto the network and from the network to a second proxy and then onto the second end terminal.

In one embodiment, the compressor and the encryptor are located at the first end terminal.

In one embodiment, the compressor is located at the first end terminal and the encryptor is located at the first proxy.

According to a fifth aspect of the invention there is provided apparatus for receiving second protocol data which has been compressed and encrypted in accordance with a first protocol and which has been transmitted over a first protocol network comprising the steps of decrypting the first protocol compressed data in accordance with the first protocol and decompressing the data to be transmitted in accordance with the first protocol.

In one embodiment, the data has been transmitted from a first end terminal supporting a second protocol to a second end terminal supporting a second protocol via the network supporting the first protocol.

In one embodiment, the data has been transmitted from the first end terminal to a first proxy and then onto the network and from the network to a second proxy and then onto the second end terminal.

In one embodiment, decompressing the data comprises decompressing the data at a second end terminal and decrypting the data comprises decrypting the data at the second end terminal.

In one embodiment, decompressing the data comprises decompressing the data at a second end terminal and decrypting the data comprises decrypting the data at the second proxy.

The invention also provides for a system for the purposes of communications which comprises one or more instances of apparatus embodying the present invention, together with other additional apparatus.

In particular, according to a sixth aspect of the invention there is provided a system for transmitting data of a second protocol type over a first protocol type network, where in the system includes first and second end terminals which support the second protocol data, first and second proxy intermediates. The respective end terminals and the network and a network supporting a first protocol and where in data is transmitted from the first terminal to the second terminal via the proxies and the network and wherein the data is firstly compressed and secondly encrypted in accordance with the first protocol before being transmitted on the network.

The invention also provides for computer software in a machine-readable form and arranged, in operation, to carry out every function of the apparatus and/or methods.

In particular, according to a seventh aspect of the invention there is provided a program for a computer in a machine readable form having code portions arranged to perform the steps of preparing second protocol data for transmitting over a first protocol network comprising the steps of compressing the data to be transmitted in accordance with the first protocol, to produced first protocol compressed data and encrypting the first protocol compressed data in accordance with the first protocol to produce first protocol compressed and encrypted data.

According to an eighth aspect of the invention there is provided a program for a computer in a machine readable form having code portions arranged to perform the steps of transmitting second protocol data over a first protocol network comprising the steps of compressing the data to be transmitted in accordance with the first protocol, to produced first protocol compressed data; encrypting the first protocol compressed data in accordance with the first protocol to produce first protocol compressed and encrypted data; and transmitting the second protocol data over the first protocol network.

According to a ninth aspect of the invention there is provided a program for a computer in a machine readable form having code portion arranged to perform the steps of compressing the data at a first end terminal and encrypting the data comprises encrypting the data at the first proxy.

The invention also provides for novel signal encodings arising from the operation of the methods, apparatus, and software.

Other aspects of the invention include: the request from the client to first proxy, associated with the data, asking the first proxy to encrypt the data and providing the encryption key; the ability of the second client (using the invention to receive data) to request an encryption key from the proxy in order to respond to a first client (which does not use the invention) which has asked for an encryption key; the ability for the second client to integrity protect the encryption key obtained in the previous statement when it is returned to the first client, using a certificate of its own; the ability for a first client to ask a second client whether it supports the method in which the S/MIME data is compressed and then encrypted both at the client, and for the second client to respond.

The preferred features may be combined as appropriate, as would be apparent to a skilled person, and may be combined with any of the aspects of the invention.

BRIEF DESCRIPTION OF THE DRAWINGS

Reference will now be made, by way of example, to the accompanying drawings in which:—

DETAILED DESCRIPTION OF THE INVENTION

Figure 1:
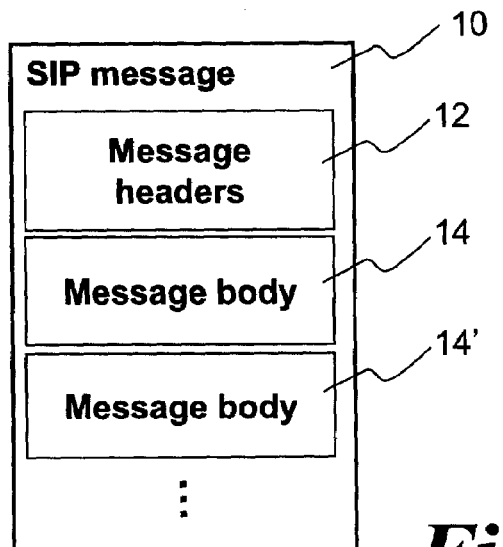
FIG. 1 is a schematic representation of a typical SIP message.
Figure 2:
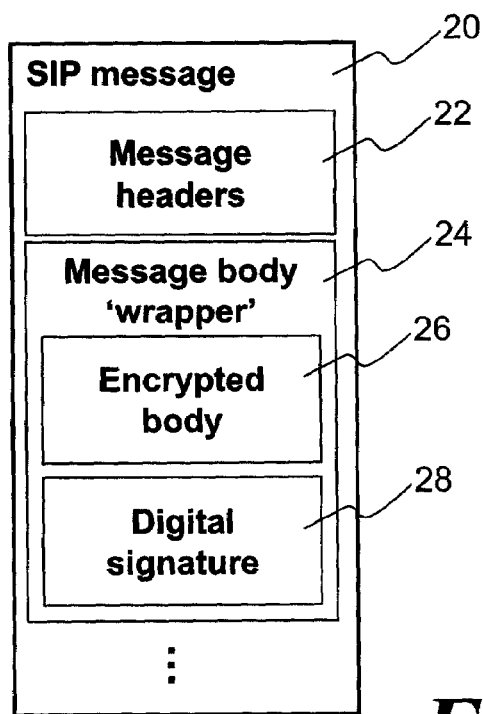
FIG. 2 is a schematic representation of a S/MIME protected SIP message.
Figure 3:
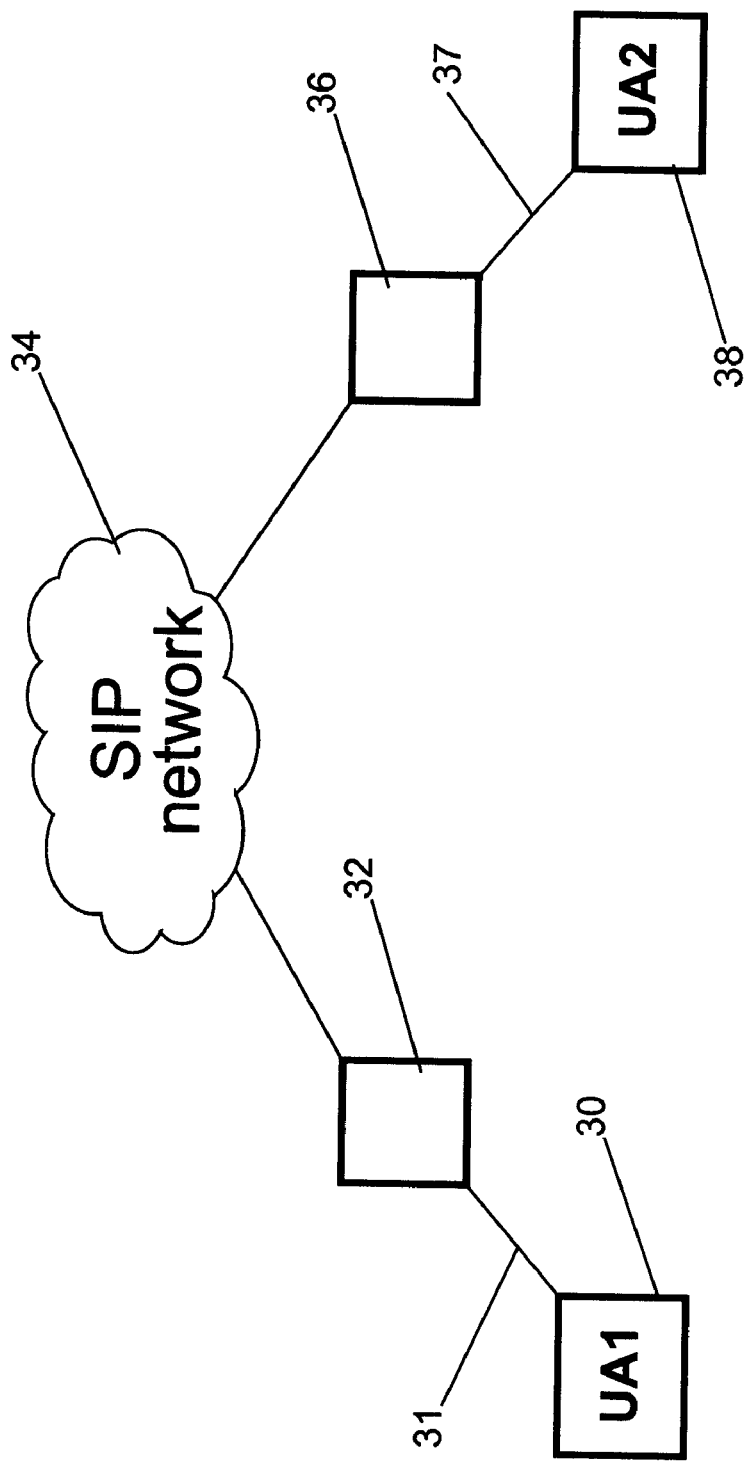
FIG. 3 is a block diagram of a low bandwidth network.

Referring to FIG. 3, a low bandwidth network such as for example a 3GPP network is shown. A first end terminal (UA1) 30 is connected to a first proxy 32 which in turn is connected to a SIP network 34. A second proxy 36 is also connected to the SIP network and to a second end terminal (UA2) 38. The end terminals may be multimedia terminals and may each be able to send, receive or both.

As previously indicated in a known SIP network data is transmitted in a manner where the data has been encrypted and then compressed. For 3GPP networks there are a number of disadvantages in applying S/MIME and then SIP compressing the data. This invention overcomes this and other problems of using S/MIME and SIP compression in a low bandwidth network.

In a first embodiment of the invention there is a low bandwidth (eg wireless access (eg. 3GPP) or slow rate fixed access (eg. copper)) link between the end terminal UA1 and the first proxy 32 [and/or between end terminal UA2 and the second proxy 36] and the proxy is trusted by the respective end terminal. The end terminal passes unencrypted data to and from the respective proxy. The encryption and/or decryption of the data occurs at the proxy rather than the end terminal. In other words the proxy provides an encryption/decryption service on behalf of the user.

Since the data on the UA proxy link 31,37 is unencrypted it can be successfully compressed. This is not a security risk since it is only the S/MIME encryption, applying to message bodies only, which is not used. There may be encryption on the UA proxy link which applies to the whole message.

The process for sending encrypted data is as follows.

As in standard S/MIME, the sending UA1 must obtain the certificate of the intended recipient. This can be done using the SIP OPTIONS method which is well known in the art. Instead of encrypting the data, the UA1 includes the recipient's certificate and an 'encrypt request' in the message to be sent. This requires new protocol extensions and is one of the key aspects of the invention. The proxy then performs the encryption and sends the message on via the SIP network.

The process for receiving encrypted data is as follows.

The receiver is asked for their certificate, so that the sender can encrypt the data. The receiver obtains a certificate from the first proxy, and sends this instead of their own certificate. This is a second key aspect of the invention. The receiver signs this certificate using their own certificate so that the sender can be sure it is the correct certificate to use. The sender uses this certificate to encrypt the data. The receiving proxy intercepts each subsequent data message, decrypts the data, and sends the unencrypted message to the receiving UA2.

Full advantage is taken of compression over the low-bandwidth links 31 and 37. In doing this a state between UA and first proxy is built up over multiple sessions so that compression becomes very efficient.

This method reduces need for mobile devices to perform public key cryptography which is important for low resource devices. The receiver needs to sign the encryption certificate provided by the proxy and this is the public key cryptography operation. In addition, security proxy functions can be sold as a 'value add' by network operator to the consumer or customer.

Although encryption is not end-to-end and relies on the trust relationship with proxy and the end terminal, this is still a useful solution. Also, the method is not fully compatible with existing SIP procedures at the far-end UA which may require some additional processing. This additional process will solve the fact that existing procedures apply encryption and then integrity—i.e. signature is over the encrypted message. The UA may not expect this procedure to apply in reverse as required by the present invention, and will thus require additional processes. Also, existing UAs may check that the certificate supplied for encryption does refer to the intended recipient. This procedure supplies a certificate referring to another entity (the security proxy). However the sender can be sure that this certificate was supplied by the intended recipient, since the certificate exchange itself can be integrity protected.

Figure 4:
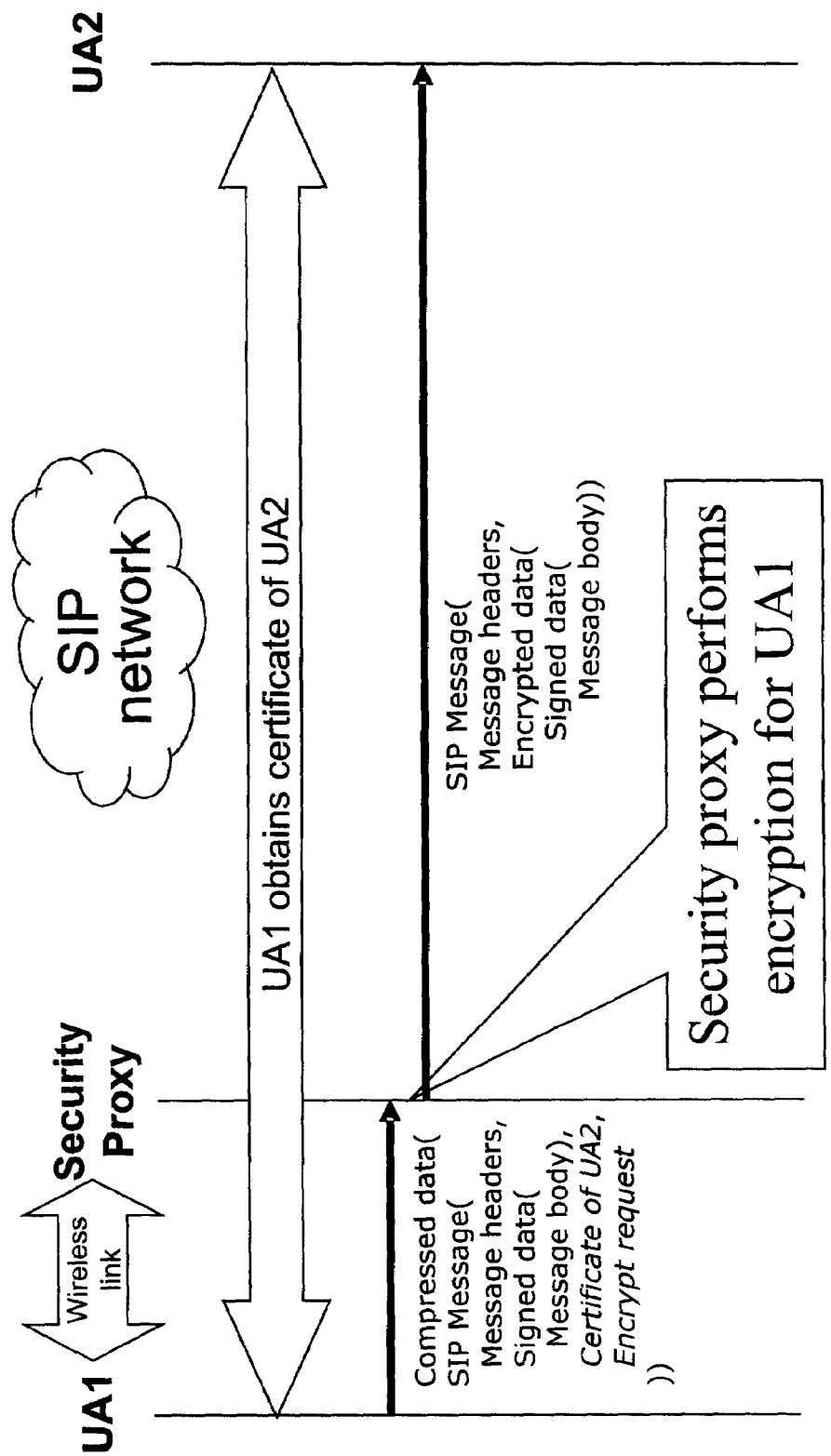
FIG. 4 is a message flow diagram to show how an end terminal sends data.
Figure 5:
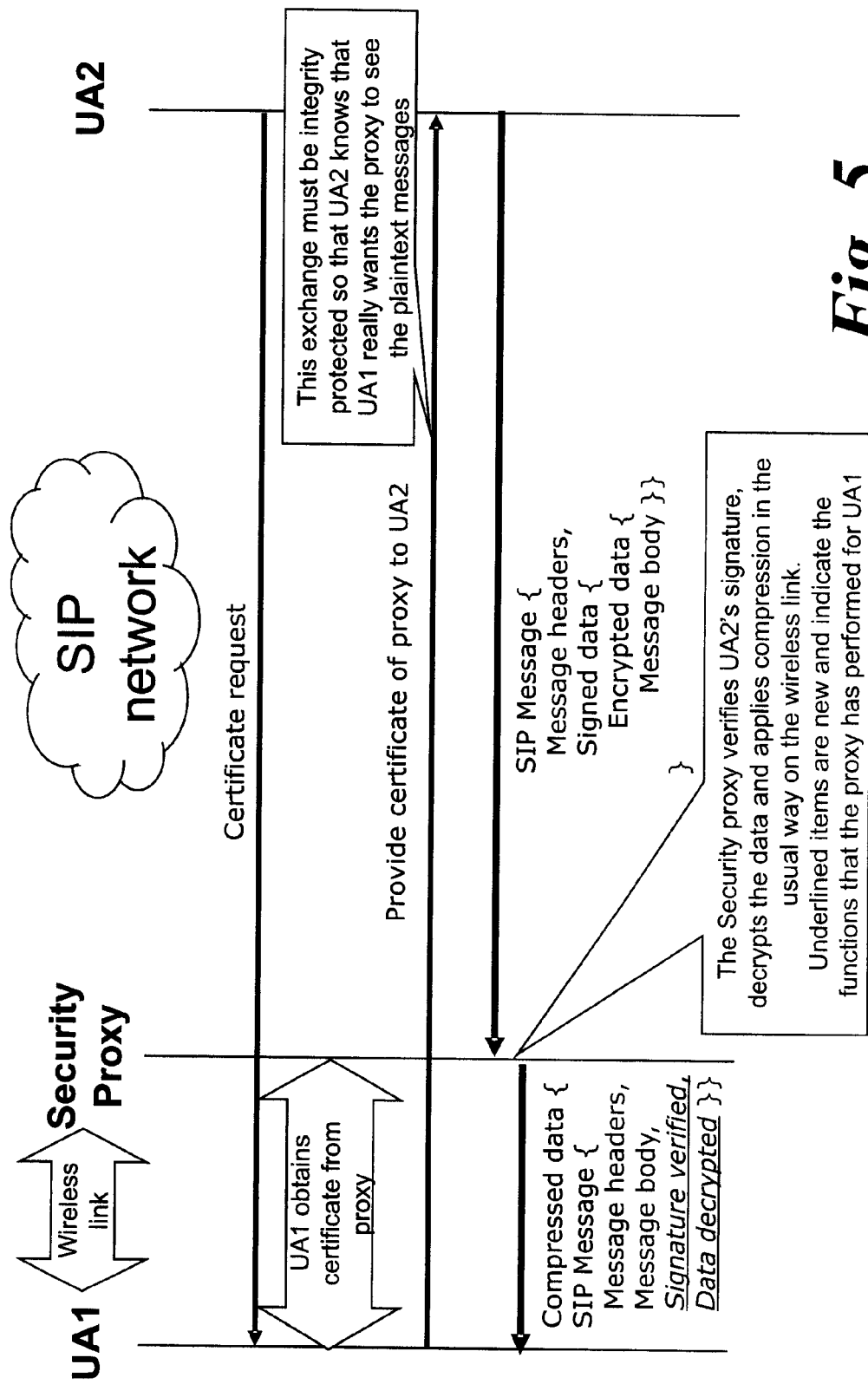
FIG. 5 is a message flow diagram to show how an end terminal receives data.

The effect of this method on message flow for sending and receiving data is shown in FIGS. 4 and 5 respectively.

In FIG. 4, UA1 wishes to send S/MIME encrypted data and wishes to benefit from SIP compression. UA1 first obtains a certficate from UA2, using well-known means (e.g. SIP OPTIONS message). Secondly, UA1 prepares the SIP message to be sent, but without using S/MIME encryption. UA1 adds additional information to the message to indicate firstly that it wishes the proxy to perform S/MIME encryption, and secondly to include the certificate obtained from UA2.

UA1 then compresses the whole message according to SIP compression. UA1 may then encrypt and/or integrity protect the entire message according to whatever security schemes is/are being used between UA1 and the first proxy (e.g. IPSEC, TLS).

The Security Proxy receives the message and decrypts it. The Security Proxy then decompresses the message according to SIP compression. Based on the presence of the indicators described above, the security proxy applies S/MIME encryption to the message body, using the certificate provided. The security proxy then removes this indication and the certificate and sends the message onwards into the SIP network.

Finally, UA2 receives the message and applies S/MIME decrytion according to the S/MIME standards.

In FIG. 5, UA1 wishes to receive S/MIME encrypted data and wishes to benefit from SIP compression. In order to send encrypted data, UA2 must obtain the certificate of UA1 using well-known means (e.g. SIP OPTIONS message). On receiving such a request, UA1 requests and obtains a certificate from the Security Proxy. UA1 returns this certificate to UA2 as if it were its own. UA1 may integrity protect this certificate, so that UA2 knows that it is the correct certificate to use.

UA2 then applies S/MIME encryption using the certificate provided by UA1 and sends the message. The security proxy receives the message and applies S/MIME decryption. Since the certificate used for the encryption was the one provided initially by the security proxy, the proxy is able to perform the decryption. The security proxy then compresses the decrytped message. The security proxy may then encrypt and/or integrity protect the message using whatever security schemes is/are being used between the security proxy and UA1.

On receiving the message, UA1 performs decryption and decompression according to existing standards.

The following assumes that the end terminal has an established security association with the first hop proxy.

A capability exchange is required to indicate that the proxy has the 'S/MIME proxy' capability. In 3GPP IMS, this could be achieved during the registration phase. The end terminal obtains the certificate/Public Key of the intended recipient of a message. This may be achieved through a previous SIP exchange (as described in the SIP specification), direct from a public registrar or using other means. The end terminal then obtains the certificate/Public Key of the local proxy. Using it's own Private Key, the end terminal signs any parts of the SIP message to be sent and includes its certificate in the message. The end terminal then includes the certificate of the proxy, and signs this along with an indication to the peer end terminal that this certificate should be used for encrypting data to be returned to the end terminal. The end terminal also includes in the message the certificate of the intended recipient, and an instruction to the proxy to apply S/MIME encryption. The proxy then applies the S/MIME encryption. The peer end terminal decrypts the encrypted portion of the message and verifies the signature. The peer end terminal verifies the signature of the proxy certificate supplied previously. It then uses this proxy certificate to encrypt any data to be protected by S/MIME. It must sign this data before encrypting. The proxy then decrypts the data encrypted by the peer end terminal and passes the data unencrypted to the end terminal. The proxy includes an indication that it has performed this function. The end terminal then verifies the signature is correct.

Note that certificates can be fairly large, so the additional certificates, if included in full in the messaging, might negate the compression advantage for the initial message exchange. A mechanism to include a reference to the certificate (e.g. HTTP URL) could be used instead.

In an alternative embodiment of the present invention an end-to-end compression method is proposed.

It is preferred that existing compression schemes occur link-by-link. This method uses compression end-to-end for the encrypted data. Data is compressed first, and then encrypted by the UA. This requires a priori knowledge that the intended recipient supports this mode of compression. Since link-by-link compression requires a priori knowledge that the next proxy supports compression we have found that certificate discovery mechanisms can be extended to find out if compression is supported at the UA rather than just the next proxy.

In order to send encrypted data the UA must obtain the certificate of the intended recipient. If SIP is used for this, then an indication of support for "SIGCOMP inside encrypted data blocks" can be obtained. If SIGCOMP is supported by the intended recipient, the data is compressed first, and then encrypted. This first compressed message must contain the UDVM decompression code. Although the compression gain is not as high as with other methods, it is still a significant advantage in low bandwidth networks, e.g. 3GPP. Subsequent messages with the same endpoint (i.e. in the same session), can utilise the state established by previous messages and thereby further exploit the advantages and increase the compression gains.

To receive encrypted data, the UA wishing to receive encrypted data must indicate its desire for the data to be compressed first when it supplies its certificate. The receiving UA then applies the same procedures for sending data.

This embodiment maintains end-to-end encryption and is compatible with existing procedures for a far end UA (e.g. UA2). If the far end UA does not support the compression of encrypted data, then non-compressed data can be used.

An alternative solution would be to apply SIP compression to the parts of the message to be S/MIME encrypted before applying the S/MIME encryption It is only the S/MIME encrypted message body which is SIGCOMP compressed end-to-end. The whole message (including the compressed-then-encrypted S/MIME parts) could then be compressed on the first link.

However, SIP compression relies on a shared dictionary between the compressor and decompressor. This dictionary is built from previous messages, and the compression becomes more efficient after a number of messages have been transferred. It is possible to attain 50% compression even on the first message.

In the present solution, the peer decompressor/compressor to the client is on the first hop proxy. It participates in all sessions that the client participates in and so quickly builds a suitable dictionary.

If compression is applied before S/MIME encryption, this implies a peer decompressor on the final intended recipient (who is the only person who can decrypt the message).

The second embodiment is superior if support at peer end terminal is provided, e.g. 3GPP IMS. The first embodiment provides lesser security for case where peer end terminal does not explicitly support this embodiment. Further processing may be needed in SIP S/MIME specifications on peer node handling of a node with a security proxy.

Low bandwidth networks can include wireless, wireline, access, 3GPP and any others that would be described thus by the person skilled in the art.

The invention claimed is:

1. A method of preparing second protocol data for transmitting over a first protocol network comprising the steps of: compressing the data to be transmitted in accordance with the first protocol, to produce first protocol compressed data; and encrypting the first protocol compressed data in accordance with the first protocol to produce first protocol compressed and encrypted data; wherein the method further comprises transmitting the second protocol data from a first end terminal supporting a second protocol to a second end terminal supporting a second protocol via the first protocol network.

2. The method of claim 1, further comprising transmitting the second protocol data from the first end terminal to a first proxy and then onto the network and from the network to a second proxy and then onto the second end terminal.

3. The method of claim 2, wherein compressing the data comprises compressing the data at a first end terminal and encrypting the data comprises encrypting the data at the first end terminal.

4. The method of claim 2, wherein compressing the data comprises compressing the data at a first end terminal and encrypting the data comprises encrypting the data at the first proxy.

5. The method of claim 1 wherein the first protocol is high bandwidth and the second protocol is low bandwidth.

6. The method of claim 1, wherein the first protocol is SIP and the second protocol is 3GPP packet data transport.

7. A method of transmitting second protocol data over a first protocol network comprising the steps of: compressing the data to be transmitted in accordance with the first protocol, to produce first protocol compressed data; encrypting the first protocol compressed data in accordance with the first protocol to produce first protocol compressed and encrypted data; and transmitting the second protocol data from a first end terminal supporting a second protocol to a second end terminal supporting a second protocol over the first protocol network.

8. The method of claim 7, further comprising transmitting the second protocol data from the first end terminal to a first proxy and then onto the network and from the network to a second proxy and then onto the second end terminal.

9. The method of claim 8, wherein compressing the data comprises compressing the data at a first end terminal and encrypting the data comprises encrypting the data at the first end terminal.

10. The method of claim 9, wherein compressing the data comprises compressing the data at a first end terminal and encrypting the data comprises encrypting the data at the first proxy.

11. A method of receiving second protocol data which has been compressed and encrypted in accordance with a first protocol and which has been transmitted over a first protocol network comprising the steps of decrypting the first protocol compressed data in accordance with the first protocol and decompressing the data to be transmitted in accordance with the first protocol.

12. The method of claim 11, wherein the data has been transmitted from a first end terminal supporting a second protocol to a second end terminal supporting a second protocol via the network supporting the first protocol.

13. The method of claim 12, wherein the data has been transmitted from the first end terminal to a first proxy and then onto the network and from the network to a second proxy and then onto the second end terminal.

14. The method of claim 13, wherein decompressing the data comprises decompressing the data at a second end terminal and decrypting the data comprises decrypting the data at the second end terminal.

15. The method of claim 14, wherein decompressing the data comprises decompressing the data at a second end terminal and decrypting the data comprises decrypting the data at the second proxy.

16. Apparatus for preparing second protocol data for transmission over a first protocol network comprising: a compressor for compressing the data to be transmitted in accordance with the first protocol, to produce first protocol compressed data; and an encryptor for encrypting the first protocol compressed data in accordance with the first protocol to produce first protocol compressed and encrypted data; wherein the apparatus is configured to transmit the second protocol data from a first end terminal supporting a second protocol to a second end terminal supporting a second protocol via the first protocol network.

17. The apparatus of claim 16, wherein the second protocol data is transmitted from the first end terminal to a first proxy and then onto the network and from the network to a second proxy and then onto the second end terminal.

18. The apparatus of claim 17, wherein the compressor and the encryptor are located at the first end terminal.

19. The apparatus of claim 17, wherein the compressor is located at the first end terminal and the encryptor is located at the first proxy.

20. Apparatus for receiving second protocol data which has been compressed and encrypted in accordance with a first protocol and which has been transmitted over a first protocol network, the apparatus being configured to decrypt the first protocol compressed data in accordance with the first protocol and decompress the data received in accordance with the first protocol, wherein the apparatus is further configured to receive the data from a first end terminal supporting a second protocol at a second end terminal supporting a second protocol via the first protocol network.

21. The apparatus of claim 20, wherein the data has been transmitted from the first end terminal to a first proxy and then onto the network and from the network to a second proxy and then onto the second end terminal.

22. The apparatus of claim 21, wherein decompressing the data comprises decompressing the data at a second end terminal and decrypting the data comprises decrypting the data at the second end terminal.

23. The apparatus of claim 22, wherein decompressing the data comprises decompressing the data at a second end terminal and decrypting the data comprises decrypting the data at the second proxy.

24. A system for transmitting data of a second protocol type over a first protocol type network, where in the system includes first and second end terminals which support the second protocol data, first and second proxy intermediate the respective end terminals and the network and a network supporting a first protocol and where in data is transmitted from the first terminal to the second terminal via the proxies and the network and wherein the data is firstly compressed and secondly encrypted in accordance with the first protocol before being transmitted on the network.

25. A program for a computer in a machine readable form having code portion arranged to perform the steps of preparing second protocol data for transmitting over a first protocol network comprising the steps of: compressing the data to be transmitted in accordance with the first protocol, to produce first protocol compressed data; and encrypting the first protocol compressed data in accordance with the first protocol to produce first protocol compressed and encrypted data; wherein the method further comprises transmitting the second protocol data from a first end terminal supporting a second protocol to a second end terminal supporting a second protocol via the first protocol network.

26. A program for a computer in a machine readable form having code portion arranged to perform the steps of transmitting second protocol data over a first protocol network comprising the steps of: compressing the data to be transmitted in accordance with the first protocol, to produce first protocol compressed data; encrypting the first protocol compressed data in accordance with the first protocol to produce first protocol compressed and encrypted data; and transmitting the second protocol data from a first end terminal supporting a second protocol to a second end terminal supporting a second Protocol over the first protocol network.

* * * * *